United States Patent [19]

Grisar et al.

[11] 3,900,565

[45] Aug. 19, 1975

[54] HYPOGLYCEMIC COMPOSITIONS CONTAINING BENZHYDRYLLACTAMIMIDE DERIVATIVES

[75] Inventors: Johann Martin Grisar; Thomas R. Blohm, both of Cincinnati, Ohio

[73] Assignee: Richardson-Merrell Inc., Wilton, Conn.

[22] Filed: June 1, 1973

[21] Appl. No.: 366,105

Related U.S. Application Data

[62] Division of Ser. No. 180,118, Sept. 13, 1971, Pat. No. 3,782,162.

[52] U.S. Cl. .................................... 424/274
[51] Int. Cl. ............................... H61k 27/00
[58] Field of Search ........................... 424/274

[56] References Cited
OTHER PUBLICATIONS
Chemical Abstracts 72:132511p (1970).
Chemical Abstracts 75:20183p (1971).

*Primary Examiner*—Jerome D. Goldberg
*Attorney, Agent, or Firm*—L. Ruth Hattan; Eugene O. Retter; George W. Rauchfuss, Jr.

[57] ABSTRACT

Pharmaceutical compositions with hypoglycemic and diuretic properties and methods for their use are disclosed herein. The active ingredients of the compositions are compounds of the formula

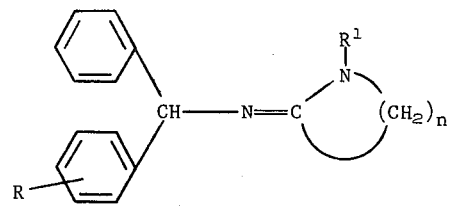

wherein R is hydrogen or lower alkoxy of from 1 to 6 carbon atoms, and when R represents lower alkoxy the substituent alkoxy radical may be attached at the ortho-, meta- or para-position of the phenyl radical; $R^1$ is hydrogen or lower alkyl of from 1 to 4 carbon atoms; n is a whole integer of from 3 to 11; or pharmaceutically acceptable acid addition salts of said compounds and individual optical isomers where applicable.

7 Claims, No Drawings

HYPOGLYCEMIC COMPOSITIONS CONTAINING BENZHYDRYLLACTAMIMIDE DERIVATIVES

This is a division, of application Ser. No. 180,118, filed Sept. 13, 1971, now U.S. Pat. No. 3,782,162.

FIELD OF INVENTION

This invention relates to pharmaceutical compositions with hypoglycemic and diuretic properties containing benzhydryllactamimide derivatives as the active ingredient, and to the use of such compositions.

SUMMARY OF INVENTION

It has been found that compounds of the following formula, or pharmaceutically acceptable acid addition salts of said compounds and individual optical isomers where applicable, are useful as hypoglycemic and diuretic agents:

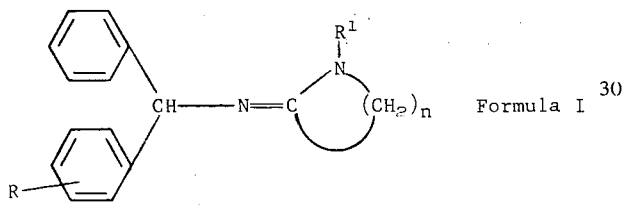

Formula I wherein R is hydrogen or lower alkoxy of from 1 to 6 carbon atoms; and when R represents lower alkoxy the substituent alkoxy radical may be attached at the ortho-, meta- or para-positions of the phenyl ring; $R^1$ is hydrogen or lower alkyl of from 1 to 4 carbon atoms; and $n$ is a whole integer of from 3 to 11.

DISCUSSION OF THE PRIOR ART

Compounds of Formula I wherein R is hydrogen, $R^1$ is lower alkyl and $n$ is an integer from 3 to 5 and processes for the preparation thereof are disclosed in French Pat. No. 1,576,111 of McNeil Laboratories Inc., published on July 17, 1968, and Canadian Pat. No. 850,116 of McNeil Laboratories Inc., issued on Aug. 25, 1970. In the Canadian patent some of these compounds are stated to possess antiinflammatory activity and central nervous system depressant activity. There is no disclosure of these compounds being useful as hypoglycemic or diuretic agents.

DETAILED DESCRIPTION OF INVENTION

For convenience and uniformity all of the compounds of this invention are named and represented by Formula I. It is known, however, that compounds of this type as acid addition salts may also be represented by the tautomeric form illustrated by the following Formula II:

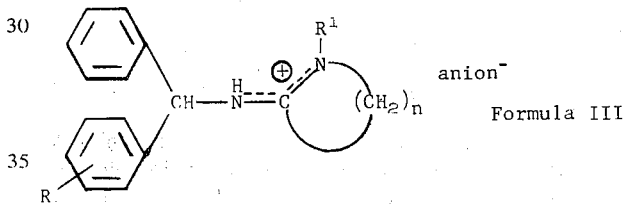

Formula II

This tautomerism has been discussed by R. Kwok and P. Pranc, J. Org. Chem. 32, 740 (1967). Structures of this formula could be named differently. In solution, under the conditions of the therapeutic utility, the proportion of each tautomeric form, or the delocalization of the charge between the two nitrogen atoms, will be dependent upon numerous factors including the nature of the substituents, the pH of the medium, and the like. This equilibrium state is conveniently depicted by the following Formula III:

Formula III

Preferred active ingredients of the compositions of this invention are compounds of the formula

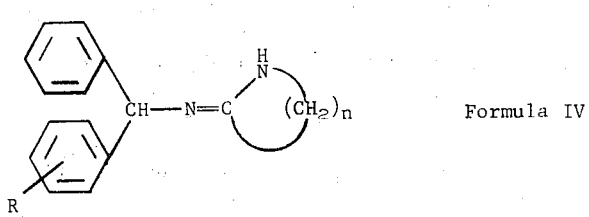

Formula IV wherein R has the meaning given hereinbefore and $n$ is a whole integer of from 3 to 7. The more preferred active ingredients of the compositions of this invention are compounds of Formula IV wherein R is hydrogen and $n$ is a whole integer of from 3 to 5.

As examples of lower alkyl radicals that $R^1$ may represent in Formulas I, II and III there may be mentioned, for example, methyl, ethyl, propyl, isopropyl, butyl, tertiary butyl and the like.

As examples of lower alkoxy radicals that R may represent in Formulas I, II, III and IV there may be mentioned, for example, methoxy, ethoxy, propoxy, butoxy, pentyloxy and the like.

Pharmaceutically acceptable acid addition salts of the base compounds of this invention are those of any suitable inorganic or organic acids. Suitable inorganic acids are for example, hydrochloric, hydrobromic, sulfuric or phosphoric acids and the like. Suitable organic acids are, for example, carboxylic acids such as acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, salicylic, 2-phenoxybenzoic and the like, or sulfonic acids such as methane sulfonic, 2-hydroxyethane sulfonic acid and the like.

As examples of compounds of this invention there may be mentioned, for example, 2-(diphenylmethylimino)hexahydroazepine hydrochloride,
hexahydro-2-[(α-phenyl-p-methoxybenzyl)imino]azepine hydrochloride,
2-[(diphenylmethyl)imino]-1-methylpiperidine hydrochloride,
2-[(diphenylmethyl)imino]octahydroazocine hydrochloride,
2-[(diphenylmethyl)imino]octahydroazonine hydrochloride,
2-[(diphenylmethyl)imino]-1-methylpyrrolidine hydrochloride,
2-[(diphenylmethyl)imino]pyrrolidine hydrochloride,
2-[(diphenylmethyl)imino]piperidine hydrochloride,
hexahydro-2-[(m-methoxy-α-phenylbenzyl)imino]azepine hydrochloride,
hexahydro-2-[(o-methoxy-α-phenylbenzyl)imino]azepine hydrochloride
2-[(p-butoxy-α-phenylbenzyl)imino]hexahydroazepine hydrochloride,
2-[(p-methoxy-α-phenylbenzyl)imino]piperidine hydrochloride,
2-[(p-ethoxy-α-phenylbenzyl)imino]octahydroazonine,
2-[(diphenylmethyl)imino]-1-propyloctahydroazocine,
2-[(diphenylmethyl)imino]azacyclotridecane hydrochloride,
2-[(diphenylmethyl)imino]-1-methylhexahydroazepine acid maleate, and the like.

It has been found that the compounds of this invention are useful as hypoglycemic and diuretic agents and can be used in the form of pharmaceutical preparations suitable for oral or parenteral administration. The quantity of compound in the unit dosage can vary over a wide range to provide from about 1.0 mg/kg to about 100 mg/kg of body weight of the patient per dose to achieve the desired effect. The desired effect can be obtained by consumption of 25 to 500 mg of the active ingredient taken 1 to 4 times daily. The compounds of this invention can be administered to warm blooded animals and particularly to mammals.

The novel compounds, together with conventional pharmaceutical carriers can be employed in unit dosage forms such as solids, for example, tablets or capsules or liquid solutions, suspensions or elixirs for oral administration and injections, or liquid solutions, suspensions, emulsions and the like for parenteral use. The quantity of active ingredient in each dosage will generally differ depending on the type of unit dosage, the type of animal and its weight. Thus, each dosage can contain from about 25 mg to over 500 mg of active ingredients in a significant quantity of pharmaceutical carrier.

As hypoglycemic agents, the compounds of this invention may be used to control hyperglycemic conditions such as occurs in diabetic patients. To illustrate the hypoglycemic activity of the compounds of this invention male rats of the Charles River C.D. strain each weighing from 120 to 140 grams were fasted for 15 hours then injected subcutaneously with 1 g/kg of body weight of glucose in 0.5 ml of 0.9% NaCl. Immediately following the glucose injection the animals were administered by oral intubation a compound of this invention in 0.5 ml of carboxymethyl celluose. 2 hours after the test compound was administered blood was withdrawn from the animals and a quantitative analysis of glucose in the plasma was performed by use of the ultramicro glucose oxidase procedure as described by L. P. Cawley et al., Am. J. Clin. Path. 32, 195–200 (1959). Animals receiving carboxymethyl cellulose with no test compound served as a control. The results of this test are summarized in the following Table I.

Table I

| Test compound | Dosage mg/kg | % Reduction in Plasma Glucose from Control |
|---|---|---|
| 2-[(Diphenylmethyl)imino]-pyrrolidine hydrochloride | 6.25 | 11 |
| | 12.5 | 24 |
| | 25 | 42 |
| | 50 | 33 |
| | 100 | 30 |
| 2-[(Diphenylmethyl)imino]-1-methylpiperidine hydrochloride | 25 | 40 |
| 2-[(Diphenylmethyl)imino]-1-methylpyrrolidine hydrochloride | 25 | 50 |
| 2-(Diphenylmethylimino)hexahydroazepine hydrochloride | 50 | 52 |
| 2-[(Diphenylmethyl)iminoi]-piperidine hydrochloride | 50 | 48 |
| 2-[(Diphenylmethyl)imino]hexahydro-1-methylazepine acid maleate | 50 | 32 |
| 2-[(Diphenylmethyl)imino]octahydroazonine hydrochloride | 100 | 21 |
| 2-[(Diphenylmethyl)imino]azacyclotridecane hydrochloride | 100 | 12 |
| 2-[(Diphenylmethyl)imino]octahydroazonine hydrochloride | 100 | 32 |
| Hexahydro-2-[α-phenyl-p-methoxybenzyl)imino]azepine hydrochloride | 100 | 15 |
| Hexahydro-2-[(m-methoxy-α-phenylbenzyl)imino]azepine hydrochloride | 100 | 11 |
| Hexahydro-2-[(o-methoxy-α-phenylbenzyl)imino]azepine hydrochloride | 100 | 9 |
| 2-[(p-Methoxy-α-phenylbenzyl)imino]piperidine hydrochloride | 100 | 47 |
| 2-[(p-Butoxy-α-phenylbenzyl)imino]hexahydroazepine hydrochloride | 100 | 9 |

The compounds of this invention are also useful as diuretic agents. For example, when 25 mg/kg of body weight of 2-[(diphenylmethyl)imino]octahydroazocine hydrochloride was orally administered to rats the per cent of urine excretion measured in milliliters was increased by 351.7% in 5 hours over that of a control group.

The compounds of Formula I wherein $R^1$ is hydrogen may be prepared by reacting an excess of a lactim ether of the general formula

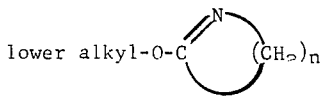   Formula V with a primary amine of the following general formula

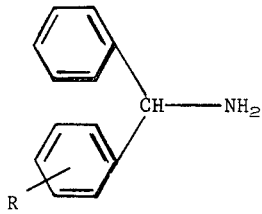   Formula VI in a manner similar to that reported by R. E. Benson and T. L. Cairns in J. Am. Chem. Soc. 70, 2115–8 (1948). The symbols $n$ and R have the meanings defined hereinbefore and lower alkyl may be methyl, ethyl or the like. This reaction may be carried out with or without a solvent. When a solvent is used that preferred is a lower alcohol; however, other solvents such as benzene, toluene and the like may be used. A basic or acidic catalyst such as a tertiary amine or hydrogen chloride may be added to the reaction mixture. In general it is preferred that the hydrochloride salt of the amine be used in the reaction. The temperature of the reaction varies from $-40°$ C to $180°$ C, and the preferred temperature is about $15°–25°$ C. The reaction time varies from 1 hour to about 60 days being dependent upon the temperature of the reaction, the reactant primary amine, and more particularly on the degree of steric hindrance of the amine since highly sterically hindered amines react very slowly.

The compounds of this invention may also be prepared using a complex of an appropriate lactam of the formula

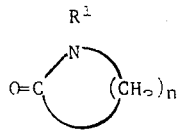

wherein $n$ and $R^1$ have the meanings defined hereinbefore, with phosphorous oxychloride, phosgene, borontrifluoride etherate, dimethyl sulfate, hydrogen halide or a combination of two or more such reagents. Several attempts have been made to formulate the structure of these complexes, and one formulation includes the vinyl halide, that is, 2-chloro-4,5,6,7-tetrahydro-3H-azepine. However, none of the formulations have been unambiguously established. This reaction has been studied by H. Bredereck in a series of articles in Chem. Ber., 1953–1968, particularly in vol. 94, 2278 (1961) and vol. 97, 1403 (1964). The complex formed is reacted with an appropriate primary amine described hereinabove in an aromatic hydrocarbon solvent such as benzene, toluene or xylene or an alkyl polyhalide solvent such as carbon tetrachloride, chloroform, methylene chloride, dichloroethane, tetrachloroethylene or the like. The reaction temperature is limited by the boiling point of the solvent, however, in some cases it is advantageous to carry out the reaction at room temperature or with cooling at $0°$ to $-40°$ C depending on the reactants.

Similarly the above reaction may be carried out by using known thiolactim ethers such as S-methylthiocaprolactim [H. Behringer and H. Meier, Ann. 607, 73–91 (1957)], or by using thiolactams wherein the latter case it may be advantageous to employ a catalyst such as mercury or silver oxide or cyanide [J. Gauthier and J. Renault, C.R. Acad. Sci. 234, (1952)].

Also by catalytic hydrogenation of an appropriate amino-pyridine derivative as described by T. Grave, J. Am. Chem. Soc. 46, 1460 (1924), M. Friefelder et al., J. Org. Chem. 29, 3730 (1964) and L. Birkhofer, Ber. 75, 429 (1942), compounds of this invention containing a pentamethylenimine moiety may be obtained.

The lactim ethers which find use in this reaction may be prepared from commercially available corresponding lactams by methods known in the art. For example, by reaction of an appropriate lactam with dimethyl sulfate in a solvent such as benzene, toluene, xylene or the like at the reflux temperature of the solvent for 2–24 hours the corresponding O-methyl lactim ether is obtained.

The primary amines which find use in this invention are benzhydrylamines of the following structure:

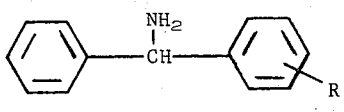   Formula VII

Several methods of preparing benzhydrylamines are known to the art. An excellent method, particularly suited to prepare unsymmetrically substituted benzhydrylamines consists of reacting phenyl or a (substituted)-phenyl magnesium halide with benzonitrile or a (substituted)-benzonitrile and to reduce the resulting ketimine complex in situ with lithium aluminum hydride. A number of methods are available to convert benzophenones (VIII)

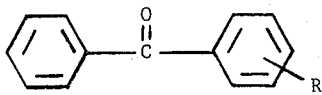   Formula VIII to benzhydrylamines either directly, for instance by the Leuckart reaction or a variation thereof, or indirectly by way of the oximes (IX)

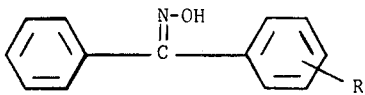   Formula IX formed from benzophenones and hydroxylamine, using a reducing agent such as lithium aluminum hydride, sodium in alcohol or molecular hydrogen in the presence of a noble metal catalyst, preferably rhodium-oncharcoal. In the above Formulas VII, VIII and IX, R has the meaning defined hereinbefore.

The following specific examples are illustrative of this invention.

EXAMPLE 1

2-(Diphenylmethylimino)hexahydroazepine hydrochloride

A slurry of 18.3 g (0.083 mole) of benzhydrylamine hydrochloride in 25 ml of O-methylcaprolactim was allowed to stand at room temperature for 3 days and was stirred occasionally with a glass rod. At first the mixture began to solidify and small amounts of anhydrous ethanol were added to keep the mixture in a stirrable slurry. The mixture was then cooled. The resulting solid was collected, washed with ether and recrystallized from methanol-acetone to give the desired compound, m.p. 264.5°–265.5° C.

EXAMPLE 2

Hexahydro-2-[(α-phenyl-p-methoxybenzyl)imino]azepine hydrochloride

A. To p-methoxyphenylmagnesium bromide, prepared from 10.8 g of magnesium turnings and 80.3 g of p-bromoanisole in about 180 ml of anhydrous ether, was added dropwise a solution of 37.2 g of benzonitrile in 50 ml of anhydrous ether. The mixture was refluxed for 3 hours and allowed to stand overnight at room temperature. The resulting slurry of ketimine salt was added dropwise to 16.3 g of lithium aluminum hydride under 1500 ml of anhydrous ether, and the mixture was refluxed overnight. The mixture was decomposed by adding 16.3 ml of water followed by 16.3 ml of 15% NaOH which was followed by 48.9 ml of water. The mixture was stirred about 5 hours at room temperature. The inorganic material was filtered off, and 250 ml of 2NHCl was added to the filtrate which was washed with water. The resulting precipitate was collected and recrystallized from isopropanol/water to give α-phenyl-p-methoxybenzylamine hydrochloride.

B. By the procedure of Example 1, only substituting for benzhydrylamine hydrochloride, an appropriate amount of α-phenyl-p-methoxybenzylamine hydrochloride the desired product was obtained, m.p. 224°–226.5° C.

EXAMPLE 3

Following the procedure of Example 2 (A) only substituting for p-methoxyphenylmagnesium bromide appropriate amounts of o- or m-methoxyphenylmagnesium bromide or p-n-butoxyphenylmagnesium bromide the following compounds were prepared:

α-phenyl-o-methoxybenzylamine hydrochloride, m.p. 260°–261° C,
α-phenyl-m-methoxybenzylamine hydrochloride, m.p. 265°–266° C (dec),
α-phenyl-p-butoxybenzylamine hydrochloride, m.p. 209°–211° C.

EXAMPLE 4

By the procedure of Example 1 only substituting for benzhydrylamine hydrochloride appropriate amounts of α-phenyl-o-methoxybenzylamine hydrochloride, α-phenyl-m-methoxybenzylamine hydrochloride or α-phenyl-p-butoxybenzylamine hydrochloride the following compounds were prepared:

hexahydro-2-[(o-methoxy-α-phenylbenzyl)imino]azepine hydrochloride, m.p. 235°–237° C,
hexahydro-2-[(m-methoxy-α-phenylbenzyl)imino]azepine hydrochloride, m.p. 235°–237° C,
2-[(p-butoxy-α-phenylbenzyl)imino]hexahydroazepine hydrochloride, m.p. 165°–168° C.

EXAMPLE 5

2-[(p-Methoxy-α-phenylbenzyl)imino]piperidine hydrochloride

By the procedure of Example 1 only substituting for benzhydrylamine hydrochloride and O-methylcaprolactim, appropriate amounts of α-phenyl-p-methoxybenzylamine hydrochloride and O-methylvalerolactim respectively, the title compound was obtained, m.p. 184°–186° C.

EXAMPLE 6

2-[(Diphenylmethyl)imino]piperidine hydrochloride

A mixture of 100.0 g (0.455 mole) of benzhydrylamine hydrochloride, 56.6 g (0.500 mole) of O-methylvalerolactim and 500 ml of methanol was refluxed for 1 hr. Most of the solvent was evaporated in vacuo, 1 liter of acetone was added and the remaining methanol was removed as azeotrop by boiling until the product precipitated. Two recrystallizations from methanol-acetone gave the title compound, m.p. 239°–241° C.

EXAMPLE 7

2-[(Diphenylmethyl)imino]pyrrolidine hydrochloride

By the procedure of Example 1, only substituting for O-methylcaprolactim an appropriate amount of O-methyl-γ-butyrolactim the title compound was obtained, m.p. 217°–218.5° C.

EXAMPLE 8

2-[(Diphenylmethyl)imino]-1-methylpiperidine hydrochloride

To 25.3 g (0.223 mole) of N-methylpiperid-2-one in 250 ml of benzene was added 34.1 g (0.223 mole) of phosphorus oxychloride over 30 minutes. The mixture was stirred at room temperature for 4 hours after which 40.8 g (0.223 mole) of benzhydrylamine was added. The reaction mixture was stirred at room temperature for 1 hour and refluxed for 4 hours then allowed to stand overnight. The resulting precipitate was washed with benzene, and the benzene wash was extracted with aqueous 2N HCl and combined with the precipitate. The combined fractions were made alkaline with 2N NaOH, extracted into ether/methylene chloride, dried and recrystallized from isopropanol to give 2-[(diphenylmethyl)imino]-1-methylpiperidine which was subsequently converted to the hydrochloride salt, m.p. 225°–228° C.

EXAMPLE 9

By the procedure of Example 8 only substituting for N-methylpiperid-2-one an appropriate amount of enantholactam, caprylolactam, azacyclotridecan-2-one or N-methylpyrrolid-2-one the following compounds were prepared:

2-[(diphenylmethyl)imino]octahydroazocine hydrochloride, m.p. 285°–286° C,

2-[(diphenylmethyl)imino]octahydroazonine hydrochloride, m.p. 283°–285° C,

2-[(diphemylmethyl)imino]azacyclotridecane hydrochloride, m.p. 140°–165° C,

2-[(diphenylmethyl)imino]-1-methylpyrrolidine hydrochloride, m.p. 194°–195° C.

EXAMPLE 10

2-[(Diphenylmethyl)imino]hexahydro-1-methylazepine acid maleate

By the procedure of Example 8 only substituting for N-methylpiperid-2-one an appropriate amount of N-methyl-ε-caprolactam, 2-[(diphenylmethyl)imino]hexahydro-1-methylazepine hydrochloride was obtained and subsequently converted to the acid maleate salt, m.p. 147°–149° C.

EXAMPLE 11

2-[(α-phenyl-p-methoxybenzyl)imino]-1-methylpyrrolidine hydrochloride

By the procedure of Example 8 only substituting for benzhydrylamine and N-methylpiperid-2-one appropriate amounts of α-phenyl-p-methoxybenzylamine hydrochloride and N-methylpyrrolid-2-one the title compound is obtained.

EXAMPLE 12

An illustrative composition for tablets is as follows:

|     |                                              | Per Tablet |
| --- | -------------------------------------------- | ---------- |
| (a) | 2[(diphenylmethyl)imino]piperidine hydrochloride | 100.0 mg |
| (b) | wheat starch                                 | 15.0 mg    |
| (c) | lactose                                      | 33.5 mg    |
| (d) | magnesium stearate                           | 1.5 mg     |

A granulation obtained upon mixing lactose with the starch and granulated starch paste is dried, screened and mixed with the active ingredient and magnesium stearate. The mixture is compressed in tablets weighing 150 mg each.

EXAMPLE 13

An illustrative composition for a parenteral injection is the following wherein the quantities are on a weight to volume basis.

|     |                                              |          |
| --- | -------------------------------------------- | -------- |
| (a) | 2-[(Diphenylmethyl)imino]-1-methylpiperidine hydrochloride | 100 mg. |
| (b) | Sodium chloride                              | q.s.     |
| (c) | Water for injection to make                  | 10 ml.   |

The composition is prepared by dissolving the active ingredient and sufficient sodium chloride in water for injection to render the solution isotonic. The composition may be dispensed in a single ampule containing 100 mg. of the active ingredient for multiple dosage or in 10 ampules for a single dosage.

EXAMPLE 14

An illustrative composition for hard gelatin capsules is as follows:

|     |                                              | Per Capsule |
| --- | -------------------------------------------- | ----------- |
| (a) | hexahydro-2[(α-phenyl-p-methoxybenzyl)imino]-azepine hydrochloride | 200 mg. |
| (b) | Talc                                         | 35 mg.      |

The formulation is prepared by passing the dry powders of (a) and (b) through a fine mesh screen and mixing them well. The powder is then filled into No. 0 hard gelatin capsules at a net fill of 235 mg. per capsule.

EXAMPLE 15

An illustrative composition for pills is as follows:

|     |                                              | Per Pill |
| --- | -------------------------------------------- | -------- |
| (a) | 2-[(Diphenylmethyl)imino]piperidine hydrochloride | 100 mg |
| (b) | Starch, corn                                 | 90 mg.   |
| (c) | Liquid glucose                               | 10 mg.   |

The pills are prepared by blending the active ingredient and starch and then adding the liquid glucose with thorough kneading to form a plastic mass. The pills are then cut and formed from the plastic pill mass.

We claim:

1. A method of inducing a hypoglycemic response in a hyperglycemic patient which comprises administering to said patient an effective hypoglycemic amount of a compound having the formula

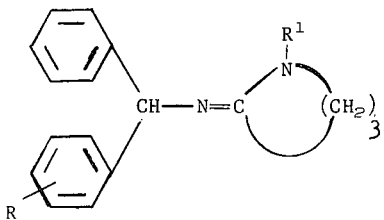

wherein R is selected from hydrogen or lower alkoxy of from 1 to 6 carbon atoms; $R^1$ is selected from hydrogen or lower alkyl of from 1 to 4 carbon atoms; or a pharmaceutically acceptable acid addition salt of said compound.

2. A method as claimed in claim 1 wherein the effective amount of compound administered is from 1 mg/kg to 100 mg/kg of body weight of the patient.

3. A method as claimed in claim 2 wherein said compound is administered in dosage units containing from 25 mg to 500 mg of said compound in tablets which are taken from 1 to 4 times daily.

4. A method as claimed in claim 2 wherein said compound is administered orally.

5. A method as claimed in claim 2 wherein said compound is administered parenterally.

6. A method as claimed in claim 2 wherein the compound has the formula

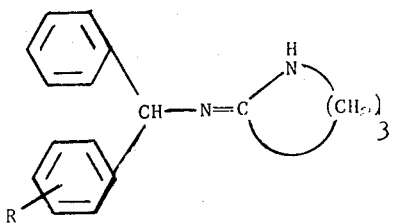
wherein R is selected from hydrogen or lower alkoxy of from 1 to 6 carbon atoms; or a pharmaceutically acceptable acid addition salt of said compound.
7. A method as claimed in claim 6 wherein the compound is 2-[(diphenylmethyl)imino]pyrrolidine hydrochloride.
* * * * *

UNITED STATES PATENT AND TRADEMARK OFFICE
CERTIFICATE OF CORRECTION

PATENT NO. : 3,900,565
DATED : August 19, 1975
INVENTOR(S) : J. Martin Grisar and Thomas R. Blohm It is certified that error appears in the above-identified patent and that said Letters Patent are hereby corrected as shown below:

Title page at item [62], line 2 "No. 3,782,162" should read "No. 3,783,162". Column 4, line 43 "methylimino..." should read "methyl)imino...". Column 4, line 44 "iminoi..." should read "imino...". Column 4, line 47 "azonine..." should read "azocine...". Column 5, line 50 "$R^1\!\!-\!\!N\!\!\diagdown$" should read "$\overset{\displaystyle R^1}{\underset{\displaystyle -N\diagdown}{|}}$".

Column 9, line 5 "diphemyl..." should read "diphenyl...".

$\mathcal{S}$igned and $\mathcal{S}$ealed this

Tenth Day of August 1976

[SEAL]

Attest:

RUTH C. MASON
Attesting Officer

C. MARSHALL DANN
Commissioner of Patents and Trademarks